(12) United States Patent
Ge et al.

(10) Patent No.: US 11,084,210 B2
(45) Date of Patent: Aug. 10, 2021

(54) 3D PRINTER WITH TUNED COOLANT DROPLETS

(71) Applicant: Hewlett-Packard Development Company, L.P., Houston, TX (US)

(72) Inventors: Ning Ge, Palo Alto, CA (US); Paul J. Benning, Corvallis, OR (US); Lihua Zhao, Sunnyvale, CA (US); Steven J. Simske, Fort Collins, CO (US); Chandrakant Patel, Fremont, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 194 days.

(21) Appl. No.: 16/072,169

(22) PCT Filed: May 17, 2016

(86) PCT No.: PCT/US2016/032885
§ 371 (c)(1),
(2) Date: Jul. 23, 2018

(87) PCT Pub. No.: WO2017/200533
PCT Pub. Date: Nov. 23, 2017

(65) Prior Publication Data
US 2019/0030797 A1    Jan. 31, 2019

(51) Int. Cl.
*B29C 64/10* (2017.01)
*B29C 64/165* (2017.01)
*B29C 64/393* (2017.01)
*B29C 64/245* (2017.01)
(Continued)

(52) U.S. Cl.
CPC .......... *B29C 64/165* (2017.08); *B29C 64/245* (2017.08); *B29C 64/295* (2017.08);
(Continued)

(58) Field of Classification Search
CPC .................................................. B29C 65/165
See application file for complete search history.

(56) References Cited

U.S. PATENT DOCUMENTS 6,572,807 B1    6/2003  Fong
10,183,332 B2   1/2019  Hirata et al.
(Continued)

FOREIGN PATENT DOCUMENTS

WO    WO-2015100086 A1 *  7/2015  ........... B29C 64/386
WO    WO-2015108546 A1     7/2015
(Continued)

OTHER PUBLICATIONS

Choi, Jae-Won, et al. "Cure depth control for complex 3D microstructure fabrication in dynamic mask projection microstereolithography." Rapid Prototyping Journal 15.1 (2009): 59-70.

*Primary Examiner* — Cachet I Proctor
(74) *Attorney, Agent, or Firm* — Mannava & Kang (57) ABSTRACT

According to an example, a three-dimensional (3D) printer may include a first delivery device to selectively deposit a fusing agent onto a layer of build materials and a second delivery device to deposit coolant droplets at tuned drop weights onto the layer of build materials. The 3D printer may also include a controller to control the second delivery device to selectively deposit the coolant droplets at the tuned drop weights onto selected areas of the build material layer, in which the drop weights of the selectively deposited coolant droplets are tuned to provide a thermal balance between multiple areas of the build material layer during application of fusing radiation onto the build material layer.

14 Claims, 6 Drawing Sheets

(51) Int. Cl.
  *B29C 64/295* (2017.01)
  *B29C 64/336* (2017.01)
  *B33Y 10/00* (2015.01)
  *B33Y 30/00* (2015.01)
  *B33Y 40/00* (2020.01)
  *B33Y 50/02* (2015.01)

(52) U.S. Cl.
  CPC .......... *B29C 64/336* (2017.08); *B29C 64/393* (2017.08); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | |
|---|---|---|
| 2003/0114936 A1 | 6/2003 | Sherwood et al. |
| 2004/0018107 A1 | 1/2004 | Khoshnevis |
| 2004/0233269 A1 | 11/2004 | Tsubota |
| 2005/0208168 A1* | 9/2005 | Hickerson ............. B29C 64/295 425/174.4 |
| 2007/0183918 A1 | 8/2007 | Monsheimer et al. |
| 2014/0366760 A1* | 12/2014 | Boland .................. B41J 11/002 101/424.1 |
| 2015/0367448 A1 | 12/2015 | Buller et al. |

FOREIGN PATENT DOCUMENTS

| | | | |
|---|---|---|---|
| WO | WO-2015108546 A2 * | 7/2015 | ......... B29C 35/0805 |
| WO | WO-2015167520 | 11/2015 | |
| WO | WO-2015167530 | 11/2015 | |
| WO | WO-2015167530 A2 * | 11/2015 | ........... B29C 64/165 |
| WO | WO-2015170330 | 11/2015 | |
| WO | WO-2016048357 A1 * | 3/2016 | ........... B29C 64/264 |

* cited by examiner

3D PRINTER WITH TUNED COOLANT DROPLETS

BACKGROUND

In three-dimensional (3D) printing, an additive printing process is often used to make three-dimensional solid parts from a digital model. 3D printing is often used in rapid product prototyping, mold generation, mold master generation, and short-run manufacturing. Some 3D printing techniques are considered additive processes because they involve the application of successive layers of material to an existing surface (template or previous layer). This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a 3D printer, methods for implementing the 3D printer to form a 3D part, and a management apparatus for controlling operations of the 3D printer. The 3D printer disclosed herein may include a first delivery device to selectively deposit a fusing agent onto a layer of build materials and a second delivery device to deposit coolant droplets at tuned drop weights onto the layer of build materials. The 3D printer may also include a controller to control the second delivery device to selectively deposit the coolant droplets at the tuned drop weights onto selected areas of the build material layer, in which the drop weights of the selectively deposited coolant droplets are tuned to provide a thermal balance between multiple areas of the build material layer during application of fusing radiation onto the build material layer.

According to an example, the controller may tune the drop weights (or equivalently, drop volumes) of the coolant droplets to a fusing radiation absorption property of the fusing agent. That is, for instance, the controller may tune the drop weights of the coolant droplets according to the fusing radiation absorption rate of the fusing agent. In one regard, the drop weights of the coolant droplets may be tuned such that the coolant droplets may substantially prevent or minimize the fusing of the build materials located adjacent to the build materials that have received the fusing agent and are to be fused together through absorption of fusing radiation while also enabling the unfused build materials to be re-used in subsequent layers. Thus, for instance, the drop weights of the coolant droplets may be tuned such that the coolant droplets deposited onto the build materials sufficiently evaporate during absorption of fusing radiation to enable the unfused build materials to be re-used.

Figure 1A:
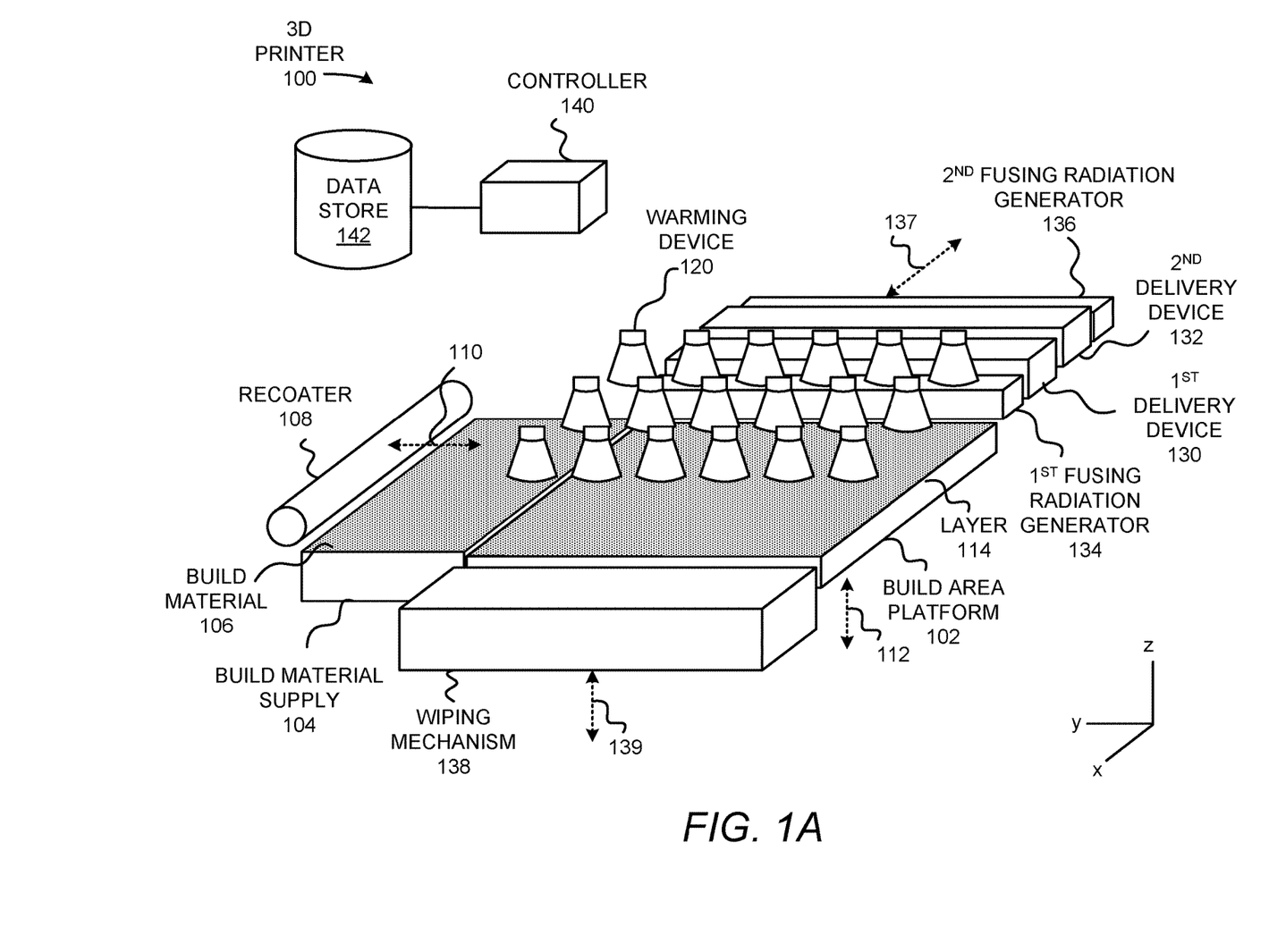
FIG. 1A shows a simplified isometric view of an example three-dimensional (3D) printer for generating, building, or printing three-dimensional parts.

With reference first to FIG. 1A, there is shown a simplified isometric view of an example three-dimensional (3D) printer 100 for generating, building, or printing three-dimensional parts. It should be understood that the 3D printer 100 depicted in FIG. 1A may include additional components, and that some of the components described herein may be removed and/or modified without departing from a scope of the 3D printer 100 disclosed herein.

The 3D printer 100 is depicted as including a build area platform 102, a build material supply 104 containing build materials 106, and a recoater 108. The build material supply 104 may be a container or surface that is used to position build materials 106 between the recoater 108 and the build area platform 102. The build material supply 104 may be a hopper or a surface upon which the build materials 106 may be supplied, for instance, from a build material source (not shown) located above the build material supply 104. Additionally, or alternatively, the build material supply 104 may include a mechanism to provide, e.g., move, the build materials 106 from a storage location to a position to be spread onto the build area platform 102 or a previously formed layer of build materials 106. For instance, the build material supply 104 may include a hopper, an auger conveyer, or the like. Generally speaking, 3D objects or parts are to be generated from the build materials 106 and the build materials 106 may be formed of any suitable material including, but not limited to, polymers, metals, and ceramics. In addition, the build materials 106 may be in the form of a powder.

The recoater 108 may move in a direction as denoted by the arrow 110, e.g., along the y-axis, over the build material supply 104 and across the build area platform 102 to spread a layer 114 of the build material 106 over a surface of the build area platform 102. The layer 114 may be formed to a substantially uniform thickness across the build area platform 102. In an example, the thickness of the layer 114 may range from about 90 μm to about 110 μm, although thinner or thicker layers may also be used. For example, the thickness of the layer 114 may range from about 20 μm to about 200 µm, or from about 50 µm to about 200 µm. The recoater 108 may also be returned to a position adjacent the build material supply 104 following the spreading of the build materials 106. The recoater 108 may be a doctor blade, roller, a counter rotating roller, or any other device suitable for spreading the build materials 106 over the build area platform 102.

The 3D printer 100 is also depicted as including a plurality of warming devices 120 arranged in an array above the build area platform 102. Each of the warming devices 120 may be a lamp or other heat source that is used to apply heat onto spread layers of the build materials 106, for instance, to maintain the build materials 106 at or above a predetermined threshold temperature. According to an example, the warming devices 120 may maintain the temperatures of the build materials 106 at a relatively high temperature that facilitates the fusing of the build materials 106 upon which a fusing agent has been mixed or applied.

The 3D printer 100 is further depicted as including a first delivery device 130 and a second delivery device 132, which may both be scanned across the build area platform 102 in both of the directions indicated by the arrow 137, e.g., along the x-axis. The first delivery device 130 and the second delivery device 132 may be, for instance, thermal inkjet printheads, piezoelectric printheads, or the like, and may extend a width of the build area platform 102. Although the first delivery device 130 and the second delivery device 132 have each been depicted in FIG. 1A as being formed of a single device, it should be understood that each of the first delivery device 130 and the second delivery device 132 may include multiple printheads that span the width, e.g., along the y-axis, of the build area platform 102.

In other examples in which the first delivery device 130 and the second delivery device 132 do not extend the width of the build area platform 102, the first delivery device 130 and the second delivery device 132 may also be scanned along the y-axis to thus enable the first delivery device 130 and the second delivery device 132 to be positioned over a majority of the area above the build area platform 102. The first delivery device 130 and the second delivery device 132 may thus be attached to a moving XY stage or a translational carriage (neither of which is shown) that is used to move the first delivery device 130 and the second delivery device 132 adjacent to the build area platform 102 in order to deposit respective liquid droplets in predetermined areas of a layer 114 of the build materials 106.

Although not shown, the first delivery device 130 and the second delivery device 132 may each include a plurality of nozzles through which the respective liquid droplets are to be ejected onto the build material layer 114. According to some examples, the liquids are a fusing agent and a coolant. In this example, the first delivery device 130 may deposit a fusing agent onto selected areas of the layer of build materials 106 and the second delivery device 132 may deposit a coolant onto other selected areas of the layer of build materials 106. In other examples, the first delivery device 130 may deposit multiple fusing agents having different fusing radiation absorption properties, for instance, the multiple fusing agents may have different fusing radiation absorption rates with respect to each other. By way of example, the multiple fusing agents may have different colors with respect to each other, may have different chemical compositions (e.g., different reactants and/or catalysts) with respect to each other, or the like. In the example in which the first delivery device 130 deposits multiple fusing agents, the first delivery device 130 may include multiple printheads, in which each of the multiple printheads may deposit a fusing agent having a different fusing radiation absorption property with respect to the other fusing agents.

According to an example, and as discussed in greater detail herein below, the second delivery device 132 may be a device that is able to deliver liquid droplets at variously controlled drop weights (or equivalently, drop volumes). For instance, the second delivery device 132 may include a printhead or multiple printheads available from HP Inc. of Palo Alto, Calif. That is, for instance, the second delivery device 132 may be controlled to selectively deposit coolant droplets at tuned (or equivalently, determined) drop weights onto selected areas of the layer of build materials 106. The drop weights of the coolant droplets may be tuned to the fusing radiation absorption properties of the fusing agent deposited on the build materials 106 adjacent to the build materials 106 on which the coolant droplets are to be deposited. For instance, the drop weights of the coolant droplets may be relatively higher for the coolant droplets that are to be deposited adjacent to build materials 106 that are to receive a fusing agent that has a lower fusing radiation absorption rate than for the coolant droplets that are to deposited adjacent to build materials 106 that are to receive a fusing agent that has a higher fusing radiation absorption rate. This may occur because fusing agents having lower fusing radiation absorption rates may require greater amounts of fusing radiation to cause the build materials 106 to fuse together. Various manners in which the drop weights of the coolant droplets may be determined are described in greater detail herein below.

Following deposition of the fusing agent(s) and the tuned coolant droplets onto selected areas of the layer of the build materials 106, a first radiation generator 134 and/or a second radiation generator 136 may be implemented to apply fusing radiation onto the layer of build materials 106. Particularly, for instance, the radiation generator(s) 134, 136 may be activated and moved across the layer 114 of build materials 106, for instance, along the directions indicated by the arrow 137, to apply fusing radiation in the form of light and/or heat onto the build materials 106. Examples of the radiation generators 134, 136 may include UV, IR or near-IR curing lamps, IR or near-IR light emitting diodes (LED), halogen lamps emitting in the visible and near-IR range, microwaves, or lasers with desirable electromagnetic wavelengths. The types of fusing radiation generators 134, 136 may depend, at least in part, on the type of active material used in the fusing agent. According to an example, the first delivery device 130, the second delivery device 132, the first fusing radiation generator 134, and the second fusing radiation generator 136 may be supported on a carriage (not shown) that may be scanned over the build area platform 102 in the directions denoted by the arrow 137.

According to an example, the first radiation generator 134 and/or the second radiation generator 136 may be controlled to apply a greater amount of fusing radiation to areas of the build materials 106 that have received a fusing agent having a lower fusing radiation absorption rate when compared to areas of the build materials 106 that have received a fusing agent having a higher fusing radiation absorption rate. By way of particular example in which a first fusing agent having a lower fusing radiation absorption rate is deposited on a first section of the layer 114 of build materials 106 and a second fusing agent having a higher fusing radiation absorption rate is deposited on a second section of the layer of build materials 106, the first radiation generator 134 and/or the second radiation generator 136 may be controlled to apply fusing radiation for a longer duration of time over the first section than the second section. In this example, the areas of the layer 114 of build materials 106 adjacent to the first section may receive coolant droplets having a larger drop weight when compared with the areas of the layer 114 of build materials 106 that are adjacent to the second section because the build materials 106 in the first section may be subjected to greater amounts of fusing radiation.

Following application of the fusing radiation to fuse selected sections of the build materials 106 together, the build area platform 102 may be lowered as denoted by the arrow 112, e.g., along the z-axis. In addition, the recoater 108 may be moved across the build area platform 102 to form a new layer of build materials 106 on top of the previously formed layer. Moreover, the first delivery device 130 may deposit a fusing agent or multiple fusing agents and the second delivery device 132 may deposit coolant droplets onto respective selected areas of the new layer of build materials 106. The above-described process may be repeated until a predetermined number of layers have been formed to fabricate a desired 3D part.

Additionally, following a liquid deposition operation across a build material layer or following multiple liquid deposition operations across multiple build material layers, the first delivery device 130 and the second delivery device 132 may be positioned adjacent to a wiping mechanism 138. The wiping mechanism 138 may wipe the nozzles of the first delivery device 130 and the second delivery device 132, as well as the nozzles of additional delivery devices if included in the 3D printer 100. The wiping mechanism 138 may be moved to a position in which a surface, such as a cleaning web (not shown), of the wiping mechanism 138 is in contact with the exterior surfaces of the nozzles. The wiping mechanism 138 may be moved in the z-direction as noted by the arrow 139 to remove debris such as, build materials 106, liquid, dust, etc., that may be in contact with the exterior surfaces of the first delivery device 130 and the second delivery device 132, to maintain the delivery devices 130, 132 at desired performance levels.

As further shown in FIG. 1A, the 3D printer 100 may include a controller 140 that may control operations of the build area platform 102, the build material supply 104, the recoater 108, the warming devices 120, the first delivery device 130, the second delivery device 132, the fusing radiation generators 134, 136, and the wiping mechanism 138. Particularly, for instance, the controller 140 may control actuators (not shown) to control various operations of the 3D printer 100 components. The controller 140 may be a computing device, a semiconductor-based microprocessor, a central processing unit (CPU), an application specific integrated circuit (ASIC), and/or other hardware device. Although not shown, the controller 140 may be connected to the 3D printer 100 components via communication lines.

The controller 140 is also depicted as being in communication with a data store 150. The data store 150 may include data pertaining to a 3D part to be printed by the 3D printer 100. For instance, the data may include the locations in each build material layer 114 that the first delivery device 130 is to deposit a fusing agent and that the second delivery device 132 is to deposit coolant droplets to form the 3D part. In one example, the controller 140 may use the data to control the locations on each of the build material layers 114 that the first delivery device 130 and the second delivery device 132 respectively deposit the fusing agent and the coolant.

Figure 1B:
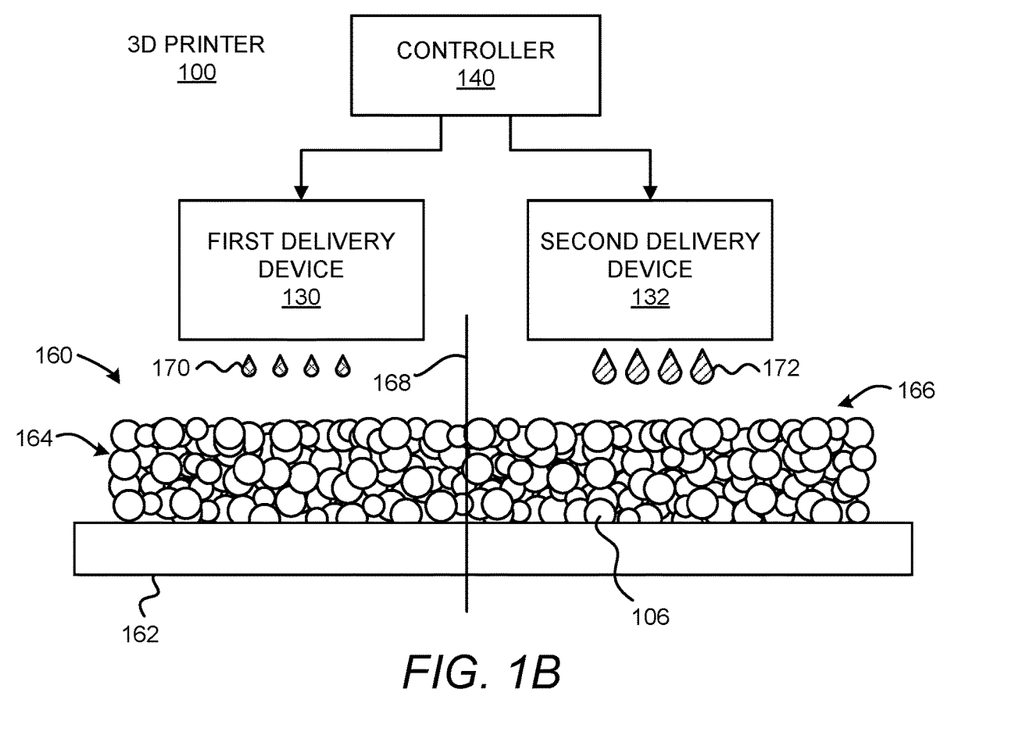
FIG. 1B shows a simplified block diagram of a few components of the example 3D printer depicted in FIG. 1A.

With reference now to FIG. 1B, there is shown a simplified block diagram of a few components of the example 3D printer 100 depicted in FIG. 1A. Particularly, the controller 140, the first delivery device 130, and the second delivery device 132 of the 3D printer 100 are shown in FIG. 1B. In addition, a layer 160 of the build materials 106 is depicted as being provided on a surface 162, which may generally represent a previously spread layer of build materials 106 or the build area platform 102. As shown, the controller 140 may control the first delivery device 130 to deposit droplets of a fusing agent 170 onto the build materials 106 in a first section 164 of the build material layer 160. In addition, the controller 140 may control the second delivery device 132 to deposit coolant droplets 172 onto the build materials 106 in a second section 166 of the build material layer 160. The first section 164 of the build material layer 160 may be distinguished from the second section 166 of the build material layer 160 by the virtual line 168 depicted in FIG. 1B.

According to an example, the first delivery device 130 may be scanned over the build material layer 160 and may be controlled to deposit the fusing agent droplets 170 onto selected areas of the layer 160, including the first section 164 shown in FIG. 1B. That is, the controller 140 may control the first delivery device 130 to deposit the fusing agent 170 onto the build materials 106 that are to be fused together. Likewise, the second delivery device 132 may be scanned over the build material layer 160 and may be controlled to deposit the coolant droplets 172 onto selected areas of the layer 160, including the second section 166 shown in FIG. 1B. That is, the controller 140 may control the second delivery device 132 to deposit the coolant droplets 172 onto the build materials 106 that are positioned adjacent to the build materials 106 in the first section 164. Thus, for instance, the coolant droplets 172 may be deposited onto the build materials 106 that are not to be fused together but may absorb excess heat through thermal bleeding from the build materials 106 that are to be fused together and/or from fusing radiation applied from either or both of the first and second fusing radiation generators 134, 136.

In examples in which the first delivery device 130 and the second delivery device 132 are supported on a common platform or carriage, the first delivery device 130 may be controlled to deposit the fusing agent droplets 170 during a first pass across the layer 160 and the second delivery device 132 may be controlled to deposit the coolant droplets 172 during a second pass across the layer 160. For instance, the first delivery device 130 may deposit the fusing agent droplets 170 as the platform or carriage is scanned in a first direction across the layer 160 and the second delivery device 132 may deposit the coolant droplets 172 as the platform or carriage is scanned in a second direction across the layer 160. In other examples, however, the first delivery device 130 and the second delivery device 132 may be controlled to respectively deposit the fusing agent droplets 170 and the coolant droplets 172 during a common pass.

According to an example, the coolant droplets 172 deposited onto the second section 166 may be controlled to have drop weights that are tuned to fusing radiation absorption properties of the fusing agent deposited onto the first section 164. That is, the drop weights at which the coolant droplets 172 may be deposited may be tuned to provide thermal balance between the build materials 106 in the first section and the build materials 106 in the second section during application of fusing radiation onto the build material layer 160. By way of example, thermal balance may be achieved when during application of fusing radiation by either or both of the first and second fusing radiation generators 134, 136, the build materials 106 in the first section 164 are fused together and the build materials 106 in the second section 166 are not fused together. That is, for instance, thermal balance may be achieved when the coolant droplets 172 are able to sufficiently cool the build materials 106 in the second section 166 to prevent those build materials 106 from fusing together while sufficient fusing radiation is supplied to the build materials 106 in the first section 164 to fuse those build materials 106 together. Additionally, thermal balance may be achieved when following application of the fusing radiation, the build materials 106 in the second section 166 may be reused in a subsequent layer. That is, when there is an insufficient amount of coolant remaining on the build materials 106 in the second section following application of the fusing radiation to enable those build materials 106 to be re-used in a subsequent layer.

The amount of fusing radiation required to fuse the build materials 106 in the first section 164 together may depend on the fusing radiation absorption properties, e.g., light absorption rates, heat absorption rates, etc., of the fusing agent applied to the build materials 106. By way of example, the fusing radiation absorption properties may vary depending upon the color of the fusing agent. For instance, darker colored fusing agents, such as black inks, may have higher fusing radiation absorption rates than lighter colored fusing agents, such as yellow or cyan inks. In another example, the fusing radiation absorption properties may vary depending upon the chemical compositions of the fusing agents. For instance, a first fusing agent having a particular additive or catalyst may have a higher fusing radiation absorption rate than a second fusing agent that does not have the particular additive or catalyst or has a different additive or catalyst.

The fusing agent may include a heat- or radiation-absorbing agent (i.e., an active material). The active material may be any suitable material that absorbs heat and/or electromagnetic radiation. The active material may be selected to absorb heat and/or any wavelength in the electromagnetic spectrum. As examples, the electromagnetic radiation absorber may absorb IR radiation (i.e., a wavelength of about 700 nm to about 1 mm, which includes near-IR radiation (i.e., a wavelength of 700 nm to 1.4 μm)), ultraviolet radiation (i.e., a wavelength of about 10 nm to about 390 nm), visible radiation (i.e., a wavelength from about 390 nm to about 700 nm), microwave radiation (i.e., a wavelength of about 1 mm to 1 about m), radio radiation (i.e., a wavelength from about 1 m to about 1000 m), or a combination thereof. An example of the active material may be a microwave radiation-absorbing susceptor, such as carbon black, graphite, magnetite, and/or various iron oxides. Carbon black may also be used as an IR (including near-IR) radiation absorber. Examples of other suitable radiation absorbers include visible dyes, or IR dyes, or any suitable colorants having radiation absorption bands within the visible spectrum of electromagnetic radiation.

As one example, the fusing agent may be an ink-type formulation including carbon black, such as, for example, the ink formulation commercially known as CM997A available from HP Inc. Within the fusing agent, the carbon black may be polymerically dispersed. The carbon black pigment may also be self-dispersed within the fusing agent (e.g., by chemically modifying the surface of the carbon black). Examples of inks including visible light enhancers are dye based colored ink and pigment based colored ink, such as the commercially available inks CE039A and CE042A, available from HP Inc.

Examples of suitable carbon black pigments that may be included in the fusing agent 170 include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4).

The carbon black pigment may be polymerically dispersed within the fusing agent 170 by a polymeric dispersant having a weight average molecular weight ranging from about 12,000 to about 20,000. In this example, the fusing agent includes the carbon black pigment (which is not surface treated), the polymeric dispersant, and water (with or without a co-solvent). When included, an example of the co-solvent may be 2-pyrollidinone. The polymeric dispersant may be any styrene acrylate or any polyurethane having its weight average molecular weight ranging from about 12,000 to about 20,000. Some commercially available examples of the styrene acrylate polymeric dispersant are JONCRYL® 671 and JONCRYL® 683 (both available from BASF Corp.). Within the fusing agent, a ratio of the carbon black pigment to the polymeric dispersant may range from about 3.0 to about 4.0. In an example, the ratio of the carbon black pigment to the polymeric dispersant is about 3.6. The polymeric dispersant may contribute to the carbon black pigment's capability for exhibiting enhanced electromagnetic radiation absorption.

In another example, the fusing agent includes active material or materials, such as metal nanoparticles. In one example, the metal nanoparticles are silver (Ag), copper (Cu), or zinc (Zn). Other examples of suitable metal nanoparticles include metal alloys (where the metals are selected from, for example, Ag, Au, Cu, Ni, Rh, Ru, Mo, Ta, Ti, Pt, or Pd), metal oxide (e.g., iron oxide), metal coated oxide (e.g., iron oxide coated with Ag, Au or Pt), cadmium selenide, and metal coated silica (e.g., silica coated with Ag or Au).

The amount of the active material that is present in the fusing agent may range from 0 wt % to about 40 wt % based on the total wt % of the fusing agent. In other examples, the amount of the active material in the fusing agent may range from about 0.3 wt % to 30 wt %, or from about 1 wt % to about 20 wt %. Generally speaking, the active material may provide a balance between the fusing agent having jetting reliability and heat and/or electromagnetic radiation absorbance efficiency.

The presence of a co-solvent, a surfactant, and/or a dispersant in the fusing agent may assist in obtaining a particular wetting behavior with the build materials 106. In some instances, the fusing agent includes water or other primary solvent, either alone or with the active material. In other instances, the fusing agent may further include a dispersing additive, a surfactant, a co-solvent, a biocide, an anti-kogation agent, and combinations thereof.

Surfactant(s) may be used to improve the wetting properties and the jettability of the fusing agent. Examples of suitable surfactants may include a self-emulsifiable, non-ionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the fusing agent may range from about 0.5 wt % to about 1.4 wt % based on the total wt % of the fusing agent.

Some examples of the co-solvent (for the water-based fusing agent 170) include 1-(2-hydroxyethyl)-2-pyrollidinone, 2-Pyrrolidinone, 1,5-Pentanediol, Triethylene glycol, Tetraethylene glycol, 2-methyl-1,3-propanediol, 1,6-Hexanediol, Tripropylene glycol methyl ether, N-methylpyrrolidone, Ethoxylated Glycerol-1 (LEG-1), and combinations thereof.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). The biocide or antimicrobial may be added in any amount ranging from about 0.05 wt % to about 0.5 wt % with respect to the total wt % of the fusing agent.

An anti-kogation agent may be included in the fusing agent. Kogation refers to the deposit of dried ink (e.g., fusing agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the fusing agent may range from greater than 0.20 wt % to about 0.62 wt % based on the total wt % of the fusing agent. In an example, the oleth-3-phosphate is included in an amount ranging from about 0.20 wt % to about 0.60 wt %, and the low molecular weight polyacrylic acid polymer is included in an amount ranging from about 0.005 wt % to about 0.015 wt %.

It is to be understood that a single fusing agent may be selectively applied to form the layer of the 3D part, or multiple fusing agents may be selectively applied to form the layer of the 3D part. In addition, or alternatively, the choice of active materials to assist in the absorption of fusing radiation, co-solvents, surfactants, dispersants, and anti-kogation agents may be deterministically optimized for specific applications and/or materials.

According to an example, the controller 140 may determine the drop weights for the coolant droplets 172 to be deposited onto the build materials 106 in the second section 166 based upon the fusing radiation absorption rate of the fusing agent 170 deposited or to be deposited on the build materials 106 in the first section 164. Particularly, as discussed above, the controller 140 may determine the drop weights for the coolant droplets 172 to be drop weights that are to result in the thermal balance between the build materials 106 in the first section 164 and the build materials 106 in the second section 166. In addition, the controller 140 may control the second delivery device 132 to deposit the coolant droplets 172 at the determined drop weights onto the build materials 106 in the second section 166.

The coolant droplets 172 may be composed of any suitable liquid that is to cool the build materials 106 and to prevent the build materials 106 from fusing together during application of fusing radiation onto the build materials 106. For instance, the coolant droplets 172 may be composed of a liquid that is to evaporate during application of the fusing radiation. In one regard, the coolant droplets 172 are to be substantially completely evaporated during application of the fusing radiation such that the unfused build materials 106 may be re-used.

The coolant droplets 172 may include water or other suitable liquid. In addition, the coolant droplets 172 may include a dispersing additive, a surfactant, a co-solvent, a biocide, an anti-kogation agent, and combinations thereof. The various examples of these elements described above with respect to the fusing agent 170 may also be applicable to the coolant droplets 172.

Figure 1C:
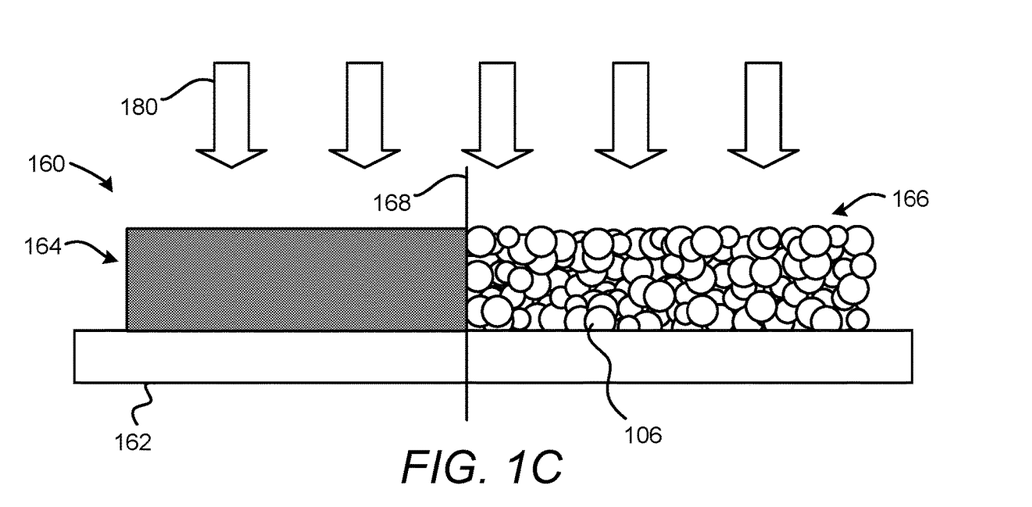
FIG. 1C shows a simplified diagram of a layer of build materials depicted in FIG. 1B during application of a first fusing radiation and a second fusing radiation from a fusing radiation generator.

Turning now to FIG. 10, there is shown a simplified diagram of the layer 160 following application of fusing radiation 180 from the either or both of the first and second fusing radiation generators 134, 136. As shown, the build materials 106 in the first section 164 may be fused together, while the build materials 106 in the second section 166 may remain unfused. Thus, the coolant droplets 172 may prevent the build materials 106 in the second section 166 from fusing together even though the same amount of fusing radiation 180 may have been applied to both the first section 164 and the second section 166.

Figure 2:
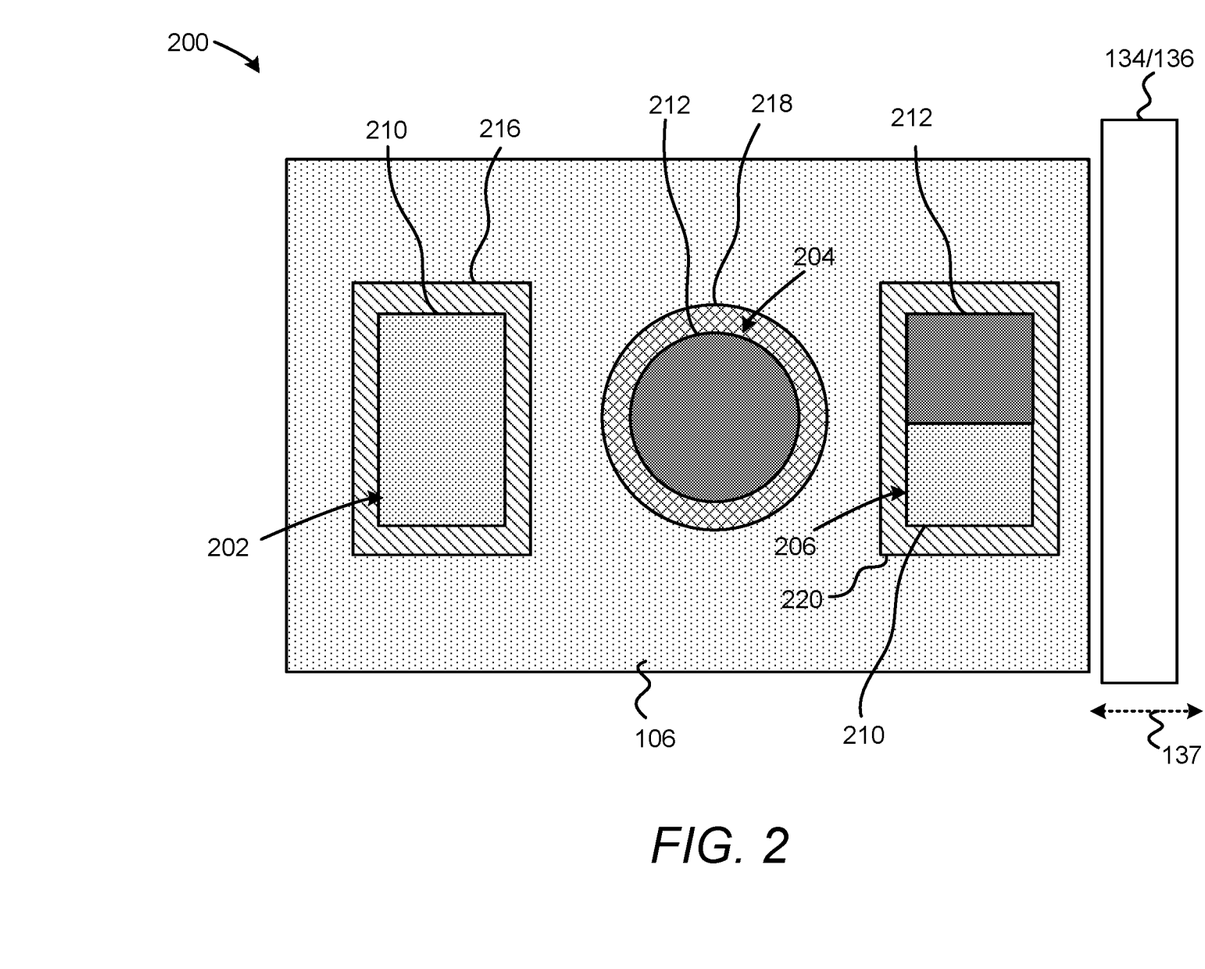
FIG. 2 shows a simplified top view of an example layer of build materials in which multiple 3D part areas may in the process of being formed.

With reference now to FIG. 2, there is shown a simplified top view of a layer 200 of build materials 106 in which multiple 3D part areas 202-206 may be in the process of being formed. The areas 202-206 depicted in FIG. 2 may include different fusing characteristics with respect to each other. For instance, the build materials 106 in the first area 202 may be provided with a first fusing agent 210, the build materials 106 in the area 204 may be provided with a second fusing agent 212, and the build materials 106 in the third area 206 may be provided with the first fusing agent 210 and the second fusing agent 212. The first fusing agent 210 may have a lower fusing radiation absorption rate than the second fusing agent 212. By way of particular example, the first fusing agent 210 may have a lighter color than the second fusing agent 212. In other examples, however, the first fusing agent 210 and the second fusing agent 212 may have different compounds with respect to each other.

In one regard, in the example depicted in FIG. 2, the build materials 106 in the first area 202 that have received the first fusing agent 210 may require a greater amount of fusing radiation to be fused together than the build materials 106 in the second area 204 that have received the second fusing agent 212. In addition, some of the build materials 106 in the third area 206 that have received the first fusing agent 210 may require a greater amount of fusing radiation to be fused together than other ones of the build materials 106 in the third area 206 that have received the second fusing agent 212. Thus, for instance, the controller 140 may control either or both of the first and second fusing radiation generators 134, 136 to apply a greater amount of fusing radiation onto the first area 202 and the third area 206 as compared with the second area 204 as the first and second fusing radiation generators 134, 136 are scanned over the layer 200 in either or both of the directions indicated by the arrow 137. The amount of fusing radiation applied by the first and/or second fusing radiation generators 134, 136 may be varied by varying either or both of the intensity level of the fusing radiation being applied and the duration at which the fusing radiation is applied by the first and/or second fusing radiation generators 134, 136.

According to an example, the controller 140 may determine the amount of fusing radiation that is to be applied to each of the first area 202, the second area 204, and the third area 206 based upon the fusing radiation absorption rates of the fusing agents 210, 212 deposited on those respective areas. By way of example, the fusing radiation absorption rates for various ones of the fusing agents may be determined, for instance, through testing, and may be stored in the data store 150. The controller 140 may determine the fusing radiation requirements for each of the first area 202 and the second area 204 for the build materials 106 to be fused in those areas based upon the stored fusing radiation absorption rates. In other examples, the controller 140 may access the fusing radiation absorption rates from a source over a network, from a user, etc. In any regard, in instances in which an area, such as the third area 206 has multiple fusing agents 210, 212, the controller 140 may determine the amount of fusing radiation to be applied to be based upon the fusing agent 210 requiring the greatest amount of fusing radiation to cause the build materials 106 on which the fusing agent 210 is deposited to be fused together.

The controller 140 may also determine the drop weights of the coolant droplets 172 (FIG. 1B) that are to be respectively deposited onto the build materials 106 that are located adjacent to the first area 202, the second area 204, and the third area 206. The controller 140 may predetermine the drop weights of the coolant droplets 172 that may result in the thermal balance or may determine the drop weights in real-time. For instance, the controller 140 may determine the drop weights of the coolant droplets 172 to be drop weights that may result in a thermal balance between the build materials 106 in the areas 202-206 and the build materials 106 in areas adjacent to the those areas 202-206. By way of example, thermal balance may be achieved when during application of fusing radiation by either or both of the first and second fusing radiation generators 134, 136, the build materials 106 in the areas 202-206 are fused together while the build materials 106 adjacent to the areas 202-206 are not fused together. That is, for instance, thermal balance may be achieved when the coolant droplets 172 are of sufficient drop weights to sufficiently cool the build materials 106 adjacent to the areas 202-206 to prevent those build materials 106 from fusing together while sufficient fusing radiation is supplied to the build materials 106 in the areas 202-206 to fuse those build materials 106 together. Additionally, thermal balance may be achieved when following application of the fusing radiation, the build materials 106 in the locations outside of the areas 202-206 may be reused in a subsequent layer. That is, thermal balance may be achieved when there is an insufficient amount of leftover coolant on the build materials 106 to enable those build materials 106 to be re-usable.

As different amounts of fusing radiation may be applied to the areas 202-206, the controller 140 may determine different drop weights of the coolant droplets 172 to be applied to respective locations adjacent to the areas 202-206. For instance, the controller 140 may determine the drop weights of the coolant droplets 172 to be deposited in the locations 218 adjacent to the first area 202 to have a first drop weight. The controller 140 may also determine the drop weights of the coolant droplets 172 to be deposited in the locations 218 adjacent to the second area 204 to have a second drop weight. The controller 140 may further determine the drop weights of the coolant droplets 172 to be deposited in the locations 220 to have the first drop weight.

The controller 140 may control the first delivery device 130 to deliver the fusing agents 210, 212 onto the selected areas 202-206 of the layer 200 as shown in FIG. 2. In addition, the controller 140 may control the second delivery device 132 to deliver the coolant droplets 172 to the selected locations 216-220 at their respective determined drop weights as also shown in FIG. 2. The controller 140 may also control either or both of the first and second fusing radiation generators 134, 136 to apply fusing radiation onto the layer 200 at respectively determined fusing radiation amounts to fuse the build materials 106 in the areas 202-206 while also preventing the build materials 106 outside of the areas 202-206 from being fused together. The controller 140 may further control the formation and spreading of further layers of build materials 106 and may repeat the process described above.

Figure 3:
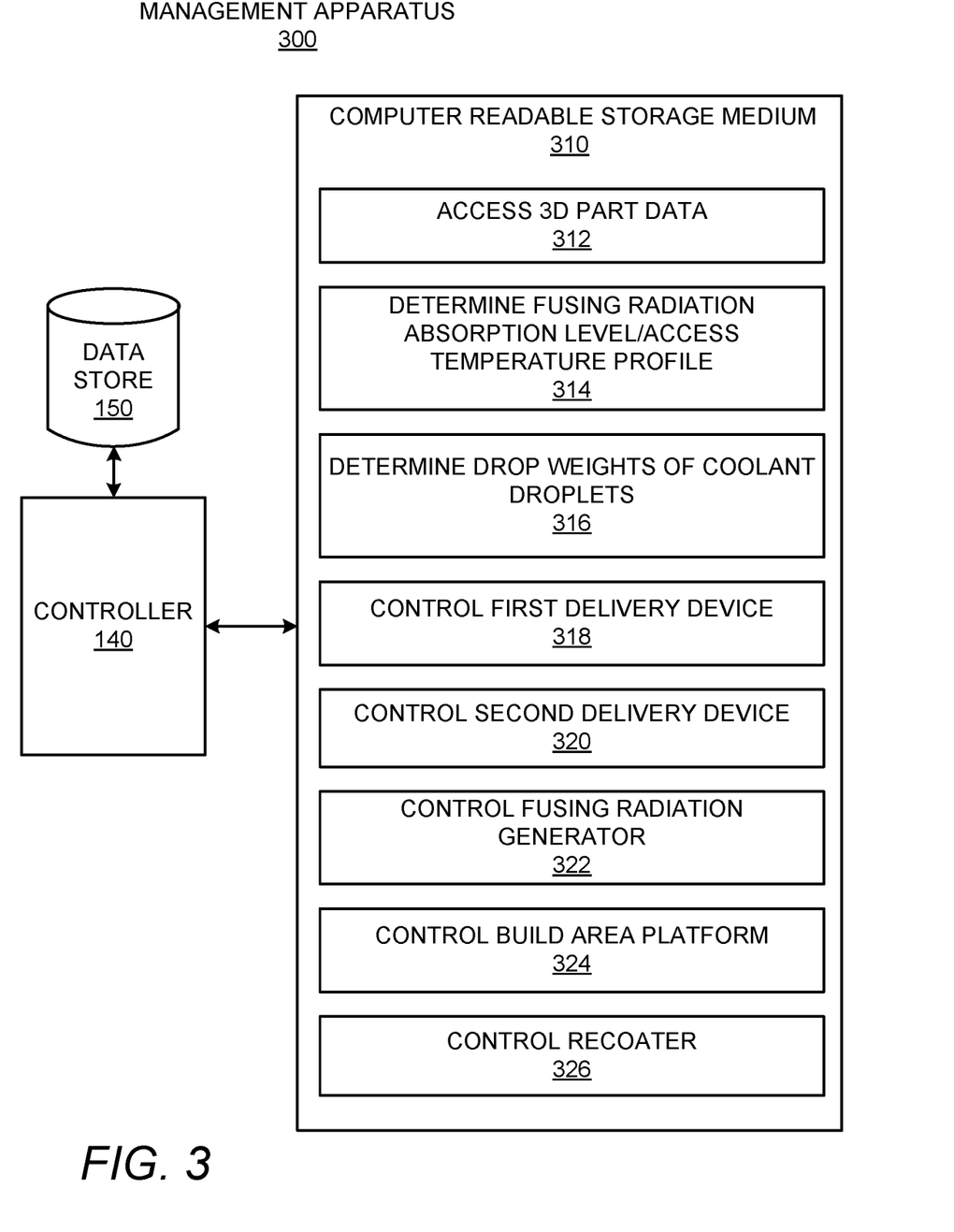
FIG. 3 shows a simplified block diagram of an example management apparatus that may be implemented in the 3D printer depicted in FIG. 1A.

Turning now to FIG. 3, there is shown a simplified block diagram of an example management apparatus 300 that may be implemented in the 3D printer depicted in FIG. 1A. In one example, the management apparatus 300 may form part of the 3D printer 100 depicted in FIG. 1A. For instance, the management apparatus 300 may be a command module or other control system of the 3D printer 100. It should be understood that the management apparatus 300 depicted in FIG. 3 may include additional components and that some of the components described herein may be removed and/or modified without departing from a scope of the management apparatus 300 disclosed herein.

The management apparatus 300 depicted in FIG. 3 is shown as including a controller 140 and a data store 150, which may be the same as the controller 140 and data store 150 depicted in and described above with respect to FIG. 1A. As such, the controller 140 and the data store 150 depicted in FIG. 3 are not described in detail and instead, the descriptions of the controller 140 and the data store 150 provided above with respect to the 3D printer 100 are intended to also describe these components with respect to the management apparatus 300.

As shown in FIG. 3, the management apparatus 300 may include a computer readable storage medium 310 on which is stored machine readable instructions 312-326 (which may also be termed computer readable instructions) that the controller 140 may execute. More particularly, the controller 140 may fetch, decode, and execute the instructions 312-326 to access data pertaining to a 3D part to be printed 312, determine a fusing radiation absorption level of the fusing agent/access a temperature profile (and/or a fusing radiation absorption profile) across a build material layer following deposition of the fusing agent 314, determine drop weights (or drop volumes) of coolant droplets to be delivered onto selected areas of the build material layer 316, control a first delivery device to deliver a fusing agent 318, control a second delivery device to deliver coolant droplets at the determined (or tuned) drop weights 320, control a fusing radiation generator to apply selected amounts of fusing radiation 322, control a build area platform 324, and control a recoater 326. As an alternative or in addition to retrieving and executing instructions, the controller 140 may include one or more electronic circuits that include components for performing the functionalities of the instructions 312-326. In any regard, and as discussed above, the controller 140 may communicate instruction signals to the various components of the 3D printer 100 via communication lines such that the components may operate in the manners described herein.

The computer readable storage medium 310 may be any electronic, magnetic, optical, or other physical storage device that contains or stores executable instructions. Thus, the computer readable storage medium 310 may be, for example, Random Access Memory (RAM), an Electrically Erasable Programmable Read-Only Memory (EEPROM), a storage device, an optical disc, and the like. The computer readable storage medium 310 may be a non-transitory machine-readable storage medium, where the term "non-transitory" does not encompass transitory propagating signals.

Figure 4:
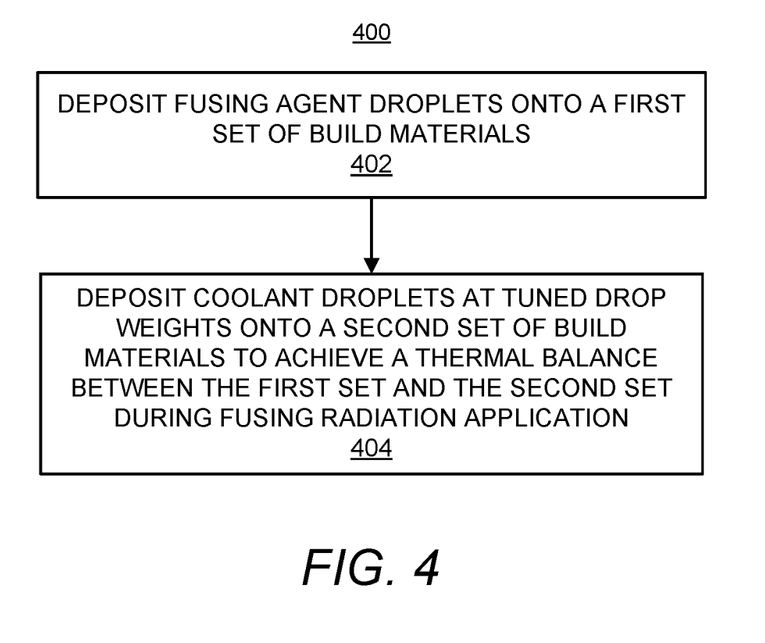
FIGS. 4 and 5, respectively, depict example methods for maintaining a thermal balance between a set of build materials that receive a fusing agent and a second set of build materials that receive coolant droplets during application of fusing radiation onto the first and second sets of build materials.
Figure 5:
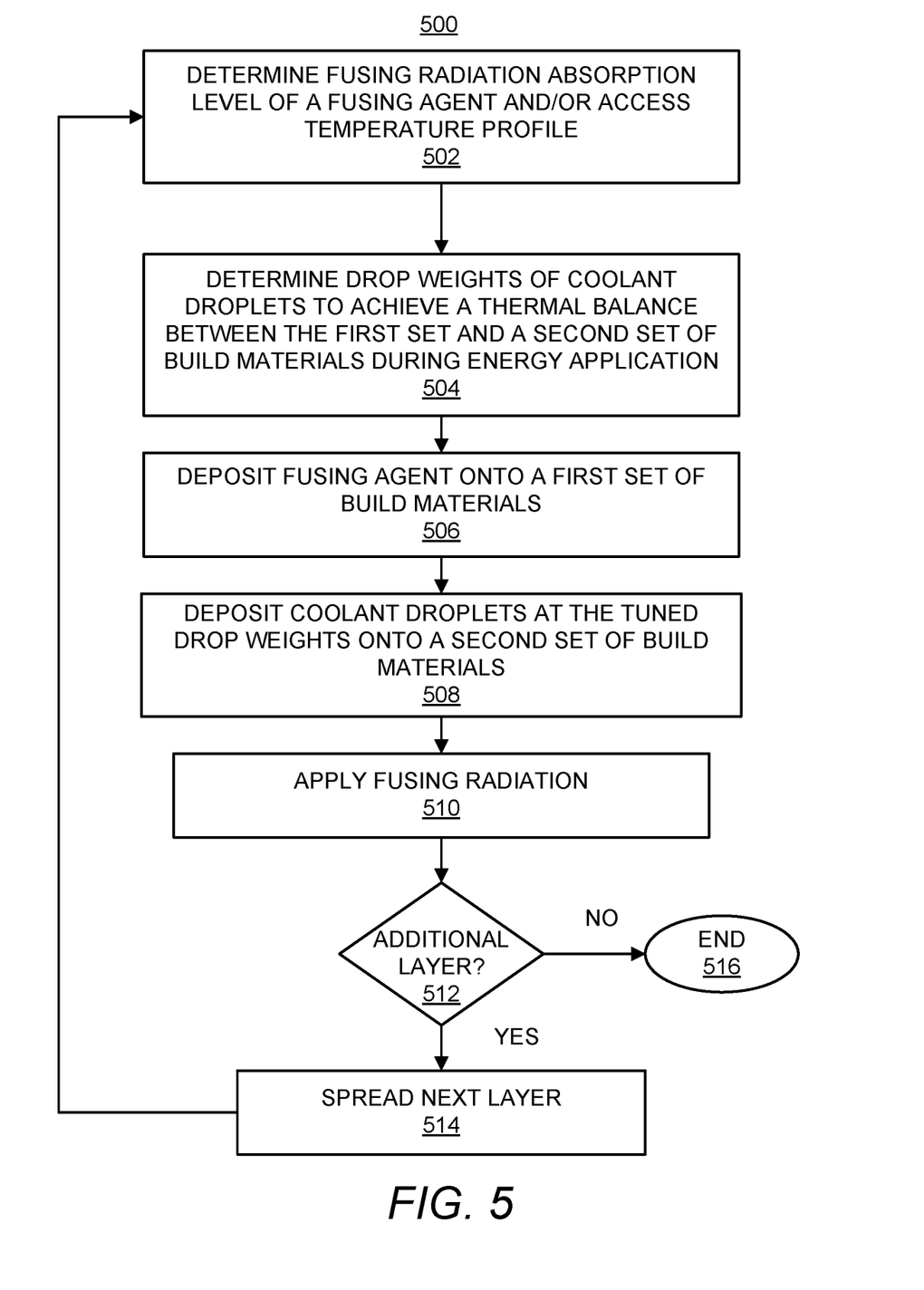

Various manners in which the management apparatus 300 may be implemented are discussed in greater detail with respect to the methods 400 and 500 respectively depicted in FIGS. 4 and 5. Particularly, FIGS. 4 and 5, respectively, depict example methods 400 and 500 for maintaining a thermal balance between a set of build materials 106 that receive fusing agent droplets 170 and a second set of build materials 106 that receive coolant droplets 172 during application of fusing radiation onto the first and second sets of build materials 106. It should be apparent to those of ordinary skill in the art that the methods 400 and 500 may represent generalized illustrations and that other operations may be added or existing operations may be removed, modified, or rearranged without departing from the scopes of the methods 400 and 500.

The descriptions of the methods 400 and 500 are made with reference to the 3D printer 100 illustrated in FIG. 1A and the management apparatus 300 illustrated in FIG. 3 for purposes of illustration. It should, however, be clearly understood that 3D printers and management apparatuses having other configurations may be implemented to perform either or both of the methods 400 and 500 without departing from the scopes of the methods 400 and 500.

Prior to execution of either of the methods 400 and 500 or as parts of the methods 400 and 500, the controller 140 may execute instructions 312 stored on the computer readable storage medium 310 to access data pertaining to a 3D part that is to be printed. By way of example, the controller 140 may access data stored in the data store 150 pertaining to a 3D part that is to be printed. The controller 140 may determine the number of layers of build materials 106 that the first delivery device 130 is to form and the locations at which fusing agent droplets 170 is or droplets of multiple fusing agents are to be deposited on each of the respective layers of build materials 106 in order to print the 3D part. The controller 140 may further determine the amount of fusing radiation to be supplied onto different locations of each of the layers by the either or both of the first and second fusing radiation generators 134, 136.

With reference first to FIG. 4, at block 402, fusing agent droplets 170 may be deposited onto a first set of build materials 106 in a build material layer 160, in which the fusing agent droplets 170 are to facilitate binding of the first set of build materials 106 to each other through absorption of fusing radiation supplied by either or both of the first and second fusing radiation generators 134, 136. For instance, the controller 140 may execute the instructions 318 to control the first delivery device 130 to deposit the fusing agent droplets 170 onto a first section 164 of the build material layer 160 as shown in FIG. 1B.

At block 404, coolant droplets 172 may be deposited at tuned drop weights onto a second set of build materials 106 of the build material layer 160, in which the coolant droplets 172 are tuned to have drop weights that result in a thermal balance between the first set of build materials 106 and the second set of build materials 106 during application of fusing radiation onto the build material layer by either or both of the first and second fusing radiation generators 134, 136. The thermal balance between the first set of build materials 106 and the second set of build materials 106 may be achieved in any of the manners discussed above. In addition, the controller 140 may execute the instructions 320 to control the second delivery device 132 to deposit the coolant droplets 172.

The controller 140 may also determine the locations at which the coolant droplets 172 are to be deposited. For instance, the controller 140 may determine that the coolant droplets 172 are to be deposited onto the build materials 106 that are within a predetermined distance from the edges of the build materials 106. The predetermined distance may be determined through testing of various types of fusing agents and may also be based upon the type of fusing agent being deposited.

With reference now to FIG. 5, at block 502, fusing radiation absorption levels of a first set of build materials 106 following deposition of a fusing agent on the first set of build materials 106 may be determined. That is, the controller 140 may execute the instructions 314 to determine what the fusing radiation absorption levels of the first set of build materials 106 will likely be following deposition of the fusing agent droplets 170 onto those build materials 106. As discussed above, the controller 140 may determine what the fusing radiation absorption levels will be based upon the fusing radiation absorption properties of the fusing agent. The controller 140 may further determine a fusing radiation absorption profile of the build material layer 160 following deposition of the fusing agent droplets 170. That is, for instance, the controller 140 may determine the predicted fusing radiation absorption rates in various locations of the layer 160 that are likely to exist following application of the fusing agent droplets 170 or droplets of multiple fusing agents onto the layer 160.

In addition, or alternatively, at block 502, a temperature profile across the build material layer 160 following deposition of the fusing agent droplets 170 may be accessed. In one example, the temperature profile across the build material layer 160 may be accessed through a direct measurement of the temperatures across the build material layer 160. In this example, the controller 140 may execute the instructions 314 to access the temperatures across the build material layer 160 as detected by a temperature sensor (not shown). In addition or alternatively, the controller 140 may predict the temperature profile of the build material layer 160 based upon the determined locations at which the fusing agent droplets 170 are to be deposited. Thus, for instance, the controller 140 may predict how the temperature may vary across the build material layer 160 depending upon the fusing radiation absorption properties of the fusing agent that is to be deposited onto the layer 160.

That is, the controller 140 may determine how the temperatures across the layer 160 are predicted to increase following application of fusing radiation onto the layer 160. As discussed above, different areas of the layer 160 may be heated to different temperatures depending upon the fusing radiation absorption rates of the fusing agents deposited on those areas. For instance, a fusing agent with a relatively lower fusing radiation absorption rate may require a higher amount of fusing radiation to cause the build materials 106 upon which the fusing agent has been deposited to become fused together. In this regard, the locations around the areas in which a fusing agent with a relatively lower fusing radiation absorption rate has been deposited may be heated to a higher temperature as compared to locations around areas in which a fusing agent with a relatively higher fusing radiation absorption rate has been deposited. Thus, for instance, the controller 140 may determine the temperature profile based upon the predicted temperature levels at various locations across the layer 160.

At block 504, the controller 140 may determine the drop weights (or drop volumes) of the coolant droplets 172 to be selectively deposited onto a second set of build materials 106 to reach a thermal balance between the first set of build materials 106 and the second set of build materials 106. A description of the thermal balance those described above with respect to FIG. 1B. In addition, the controller 140 may execute the instructions 316 to determine the drop weights of the coolant droplets 172. The controller 140 may determine the drop weights (or drop volumes) based upon a determined fusing radiation absorption levels, a determined fusing radiation absorption profile, a determined temperature profile, and/or the like.

At block 506, fusing agent droplets 170 may be deposited onto a first set of build materials 106 in a build material layer 160, in which the fusing agent is to facilitate binding of the first set of build materials 106 to each other through absorption of fusing radiation supplied by a fusing radiation generator 134. For instance, the controller 140 may execute the instructions 318 to control the first delivery device 130 to deposit the fusing agent droplets 170 onto a first section 164 of the build material layer 160 as shown in FIG. 1B. That is, the controller 140 may control the first delivery device 130 to deposit the fusing agent droplets 170 onto areas of the layer 160 that are to form part of a 3D printed part. The sequence of at which liquid droplets (e.g., fusing agent droplets and/or coolant droplets), if multiple droplets are deposited, or the order of the liquid drops if different materials are used in each of them, may be optimized for improving resolution/definition between to-be-fused areas and to-be-not-fused areas. The order in which the liquid droplets are deposited may be based on relative wicking of the liquid droplets due to differences in viscosity, permeability of the liquid droplets, etc.

At block 508, coolant droplets 172 may be selectively deposited onto a second set of build materials 106 in the build material layer 160 at the tuned (or determined) drop weights. For instance, the controller 140 may execute the instructions 320 to control the second delivery device 132 to deposit the coolant droplets 172 at the determined drop weights to achieve thermal balance between the first set and the second set of build materials 164, 166 as discussed above.

At block 510, fusing radiation may be applied onto the first section and the second section of the build material layer 160. For instance, the controller 140 may execute the instructions 322 to control the fusing radiation generator 134, 136 to apply fusing radiation onto the build material layer 160. According to an example, and as discussed above, the controller 140 may selectively apply different amounts of fusing radiation onto different areas of the layer 160 depending upon, for instance, the fusing radiation absorption properties of the fusing agents deposited onto those different areas.

At block 512, the controller 140 may determine whether an additional layer 160 is to be formed, for instance, based upon accessed information regarding the 3D part to be printed. In response to a determination that an additional layer 160 is to be formed, a next layer of build materials 106 may be spread on top of the previous layer 160, as indicated at block 514. For instance, the controller 140 may execute the instructions 324 to control the build area platform 102 to be moved downward and may execute the instructions 326 to control the recoater 108 to spread build materials 106 across the previous layer 160. In addition, blocks 502-514 may be repeated until no additional layers are to be formed, at which point the method 500 may end, as indicated at block 516.

Some or all of the operations set forth in the methods 400 and 500 may be contained as utilities, programs, or subprograms, in any desired computer accessible medium. In addition, the methods 400 and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A three-dimensional (3D) printer comprising:
a first delivery device to selectively deposit droplets of fusing agents onto a layer of build materials;
a second delivery device to selectively deposit coolant droplets having any of a number of multiple drop weights onto the layer of build materials; and
a controller to:
determine that a first fusing agent having a first fusing radiation absorption level is to be deposited onto a first area of the build material layer;
determine that a second fusing agent having a second fusing radiation absorption level is to be deposited onto a second area of the build material layer, wherein the second fusing radiation absorption level differs from the first fusing radiation absorption level;
determine a first drop weight of the coolant droplets to be selectively deposited by the second delivery device onto a first selected area adjacent the first area based on the first fusing radiation absorption level of the first fusing agent;
determine a second drop weight of the coolant droplets to be selectively deposited by the second delivery device onto a second selected area adjacent the second area based on the second fusing radiation absorption level of the second fusing agent, wherein the second drop weight differs from the first drop weight; and control the second delivery device to selectively deposit the coolant droplets at the first drop weight and the second drop weight respectively onto the first selected area and the second selected area of the build material layer, wherein the first and second drop weights of the selectively deposited coolant droplets are determined to provide a thermal balance between the first and second areas of the build material layer during application of fusing radiation onto the build material layer.

2. The 3D printer according to claim 1, wherein the controller is to determine the first and second fusing radiation absorption levels at the first and second areas of the build material layer at which the first and second fusing agents are to be selectively deposited and to determine the first and second drop weights of the coolant droplets to be selectively deposited onto the first and second selected areas to reach the thermal balance between the first and second areas based upon the determined first and second fusing radiation absorption levels at the first and second areas.

3. The 3D printer according to claim 2, wherein fusing agents having different fusing radiation absorption properties with respect to each other are deposited onto multiple areas of the build material layer and wherein the controller is to determine respective fusing radiation absorption levels at the multiple areas based upon the fusing agents applied to the multiple areas.

4. The 3D printer according to claim 2, further comprising:
a temperature sensor to detect a temperature profile across the build material layer; and
wherein the controller is to determine the first and second drop weights of the coolant droplets based also upon the detected temperature profile across the build material layer.

5. The 3D printer according to claim 2, wherein the controller is to predict a temperature profile across the build material layer, wherein the predicted temperature profile is of the build material layer following selective deposition of the first and second fusing agents on the build material layer, and wherein the controller is to determine the first and second drop weights of the coolant droplets based also upon the predicted temperature profile across the build material layer.

6. The 3D printer according to claim 2, wherein the controller is to determine the drop weights to be relatively larger for the coolant droplets that are to be deposited on a selected area that is adjacent to a first fusing area that is to receive a greater amount of fusing radiation than the coolant droplets that are to be deposited on another selected area that is adjacent to a second fusing area that is to receive a lesser amount of fusing radiation.

7. The 3D printer according to claim 1, further comprising:
a carriage, wherein the second delivery device is supported on the carriage and wherein the controller is to control the carriage to be moved across the build material layer and to control the second delivery device to selectively deposit the coolant droplets as the carriage is moved across the build material layer; and
a fusing radiation generator to selectively apply fusing radiation onto the build material layer.

8. A method comprising:
depositing droplets of a first fusing agent onto a first set of build materials in a build material layer, wherein the first fusing agent has a first fusing agent radiation absorption level;
depositing droplets of a second fusing agent onto a second set of build materials in the build material layer, wherein the second fusing agent has a second fusing agent radiation absorption level that differs from the first fusing agent radiation absorption level; and
depositing coolant droplets at a first drop weight onto a first selected area adjacent the first set of build materials, wherein the first drop weight is based on the first fusing radiation absorption level; and
depositing coolant droplets at a second drop weight onto a second selected area adjacent the second set of build materials, wherein the second drop weight is based on the second fusing radiation absorption level and differs from the first drop weight, and wherein the first and second drop weights are to provide a thermal balance between the first set of build materials and the second set of build materials during application of fusing radiation onto the build material layer by the fusing radiation generator.

9. The method according to claim 8, further comprising:
determining the first fusing radiation absorption level of the first fusing agent;
determining the second fusing radiation absorption level of the second fusing agent; and
determining the first and second drop weights of the coolant droplets to reach the thermal balance between the first set of build materials and the second set of build materials based upon the determined fusing radiation absorption levels of the first and second fusing agents.

10. The method according to claim 9, wherein a portion of the second set of build materials overlaps with a portion of the first set of build materials and wherein depositing the coolant droplets further comprises depositing the coolant droplets onto the portion of the first set of build materials that overlaps with the portion of the second set of build materials to thereby deposit fusing agent and coolant droplets onto the overlapping portion.

11. The method according to claim 8, wherein depositing coolant droplets further comprises depositing coolant droplets at a higher tuned drop volume onto a first subset of the second set of build materials and at a lower tuned drop volume onto a second subset of the second set of build materials, wherein the first subset of the second set of build materials is to receive a greater amount of fusing radiation than the second subset of the second set of build materials.

12. The method according to claim 8, further comprising:
accessing a temperature profile across the build material layer following deposition of the fusing agent; and
determining the drop volumes of the coolant droplets to be selectively deposited onto the second set of build materials to reach the thermal balance between the first set of build materials and the second set of build materials based upon the accessed temperature profile across the build material layer.

13. The method according to claim 8, further comprising:
accessing a predicted temperature profile across the build material layer, wherein the predicted temperature profile is of the build material layer following selective deposition of the first and second fusing agents on the build material layer; and determining the drop weights of the coolant droplets to be selectively deposited onto the first and second selected areas to reach the thermal balance between the first set of build materials and the second set of build materials based upon the predicted temperature profile across the build material layer.

14. A non-transitory computer readable medium on which is stored machine readable instructions that when executed by a processor, cause the processor to:
  determine a fusing radiation absorption profile of a build material layer, wherein the fusing radiation absorption profile identifies:
    a first fusing radiation absorption level at a first area of the build material layer caused by a first fusing agent that is to be deposited or has been deposited on the first area;
    a second fusing radiation absorption level at a second area of the build material layer caused by a second fusing agent that is to be deposited or has been deposited on the second area, the second fusing radiation absorption level differing from the first fusing radiation absorption level;
  determine first and second drop weights of coolant droplets to be selectively deposited onto selected areas adjacent to the first area and the second area of the build material layer based upon the determined fusing radiation absorption profile, wherein the first and second drop weights of the coolant droplets differ from each other and comprise determined sizes of the coolant droplets, and wherein the first and second drop weights of the coolant droplets are determined to result in a thermal balance between a first set of build materials that are to receive the first fusing agent and a second set of build materials that are to receive the second fusing agent during application of fusing radiation onto the build material layer by a fusing radiation generator; and
  output an instruction to a coolant delivery device to selectively deposit the coolant droplets onto the build material layer at the determined first and second drop weights.

* * * * *